United States Patent
Fischer et al.

(10) Patent No.: US 6,292,991 B1
(45) Date of Patent: Sep. 25, 2001

(54) APPARATUS AND METHOD FOR INSERTING CORNER MEMBERS IN CHANNEL-SHAPED FLANGES OF A DUCT

(75) Inventors: Herbert J. Fischer, Imperial, MO (US); Michael E. Satterfield, Cahokia, IL (US)

(73) Assignee: Engel Industries, Inc., St. Louis, MO (US)

(*) Notice: Subject to any disclaimer, the term of this patent is extended or adjusted under 35 U.S.C. 154(b) by 0 days.

(21) Appl. No.: 09/478,113

(22) Filed: Jan. 4, 2000

Related U.S. Application Data

(62) Division of application No. 09/139,613, filed on Aug. 25, 1998, now Pat. No. 6,081,985.

(51) Int. Cl.$^7$ .................................................. B23P 11/00
(52) U.S. Cl. .................... 29/243.5; 29/243.57; 29/509; 29/513; 29/809; 29/816
(58) Field of Search .................................... 29/243.5, 509, 29/513, 787, 788, 809, 816, 822, 243.57, 243.58; 221/289, 298, 299

(56) References Cited

U.S. PATENT DOCUMENTS

| | | |
|---|---|---|
| 1,600,570 * | 9/1926 | Wenn ..................................... 29/505 |
| 1,726,209 * | 8/1929 | Bersenbrugge ................... 29/243.58 |
| 2,895,214 | 7/1959 | Erdmann . |
| 2,906,433 | 9/1959 | Erdmann . |
| 2,973,108 | 2/1961 | Gable . |
| 3,023,493 | 3/1962 | Mittermaier . |
| 3,687,168 | 8/1972 | Sherman et al. . |
| 4,038,128 | 7/1977 | Mueller . |
| 4,261,098 | 4/1981 | Lincoln . |
| 4,332,203 | 6/1982 | Flowers . |
| 4,410,206 | 10/1983 | Mez . |
| 4,466,641 | 8/1984 | Heilman et al. . |
| 4,497,189 * | 2/1985 | Larson ..................................... 72/51 |
| 4,507,836 | 4/1985 | Hiromitsu . |
| 4,564,227 | 1/1986 | Murck . |
| 4,572,553 | 2/1986 | Geldner . |
| 4,579,375 | 4/1986 | Fischer et al. . |
| 4,713,959 | 12/1987 | Bennett . |
| 4,870,749 | 10/1989 | Roy et al. . |

(List continued on next page.)

Primary Examiner—S. Thomas Hughes
Assistant Examiner—Essama Omgba
(74) Attorney, Agent, or Firm—Howell & Haferkamp, LC

(57) ABSTRACT

Apparatus for inserting a corner member into channel-shaped flanges of a duct. The corner member has first and second legs. The duct includes longitudinally extending duct panels. The channel-shaped flanges of the duct extend laterally from at least one end of the duct panels. The apparatus a corner member support mechanism adapted for supporting the corner member, a duct moving mechanism, and a pressing mechanism. The duct moving mechanism has a duct pusher moveable between a first position and a second position. The duct pusher imparts a moving force against the duct upon movement of the duct pusher from its first position to its second position. The duct moving mechanism moves the duct toward the corner member and to a position in which adjacent flanges of the duct are in registration with the legs of the corner member upon movement of the duct pusher from its first position to its second position when the corner member is being supported by the corner member support mechanism and when the duct pusher is imparting the moving force against the duct. The pressing mechanism has at least one pressing member moveable between a non-pressing position and a pressing position. The pressing mechanism presses the corner member into the duct flanges upon movement of the pressing member from its non-pressing position to its pressing position when the flanges of the duct are in registration with the legs of the corner member.

12 Claims, 7 Drawing Sheets

U.S. PATENT DOCUMENTS

| | | |
|---|---|---|
| 4,989,438 | 2/1991 | Simon . |
| 5,086,638 * | 2/1992 | David .................................... 72/451 |
| 5,090,101 | 2/1992 | Welty . |
| 5,103,549 * | 4/1992 | Meinig et al. ..................... 29/525.1 |
| 5,189,784 * | 3/1993 | Welty .................................... 29/796 |
| 5,275,449 * | 1/1994 | Hunter ................................ 285/363 |
| 5,283,944 | 2/1994 | Goodhue . |
| 5,321,880 | 6/1994 | Goodhue . |
| 5,342,100 | 8/1994 | Goodhue . |
| 5,353,616 | 10/1994 | Fischer et al. . |
| 5,358,013 | 10/1994 | McClain . |
| 5,375,312 * | 12/1994 | Sakurai et al. ..................... 29/243.5 |
| 5,448,815 | 9/1995 | Kolesar . |
| 5,462,089 * | 10/1995 | McClain .............................. 138/109 |
| 5,465,652 | 11/1995 | Kiamura et al. . |
| 5,495,652 * | 3/1996 | Kitamura et al. .................. 29/243.5 |
| 5,621,956 | 4/1997 | Kolesar . |
| 5,649,347 | 7/1997 | Cattadoris . |
| 5,673,947 | 10/1997 | De Waal . |
| 5,850,687 * | 12/1998 | Ito ......................................... 29/818 |
| 5,906,041 * | 5/1999 | Ito et al. ............................... 29/809 |
| 5,926,937 | 7/1999 | Goodhue . |
| 5,954,373 * | 9/1999 | Sorkin ................................. 285/312 |
| 6,047,466 * | 4/2000 | Karpman et al. ..................... 29/809 |
| 6,056,021 * | 5/2000 | Iizuka ................................... 138/163 |
| 6,081,985 * | 7/2000 | Fischer et al. ........................ 29/509 |
| 6,134,775 * | 10/2000 | Castillo ................................ 29/798 |
| 6,158,114 * | 12/2000 | Kaczorowski ........................ 29/818 |

\* cited by examiner

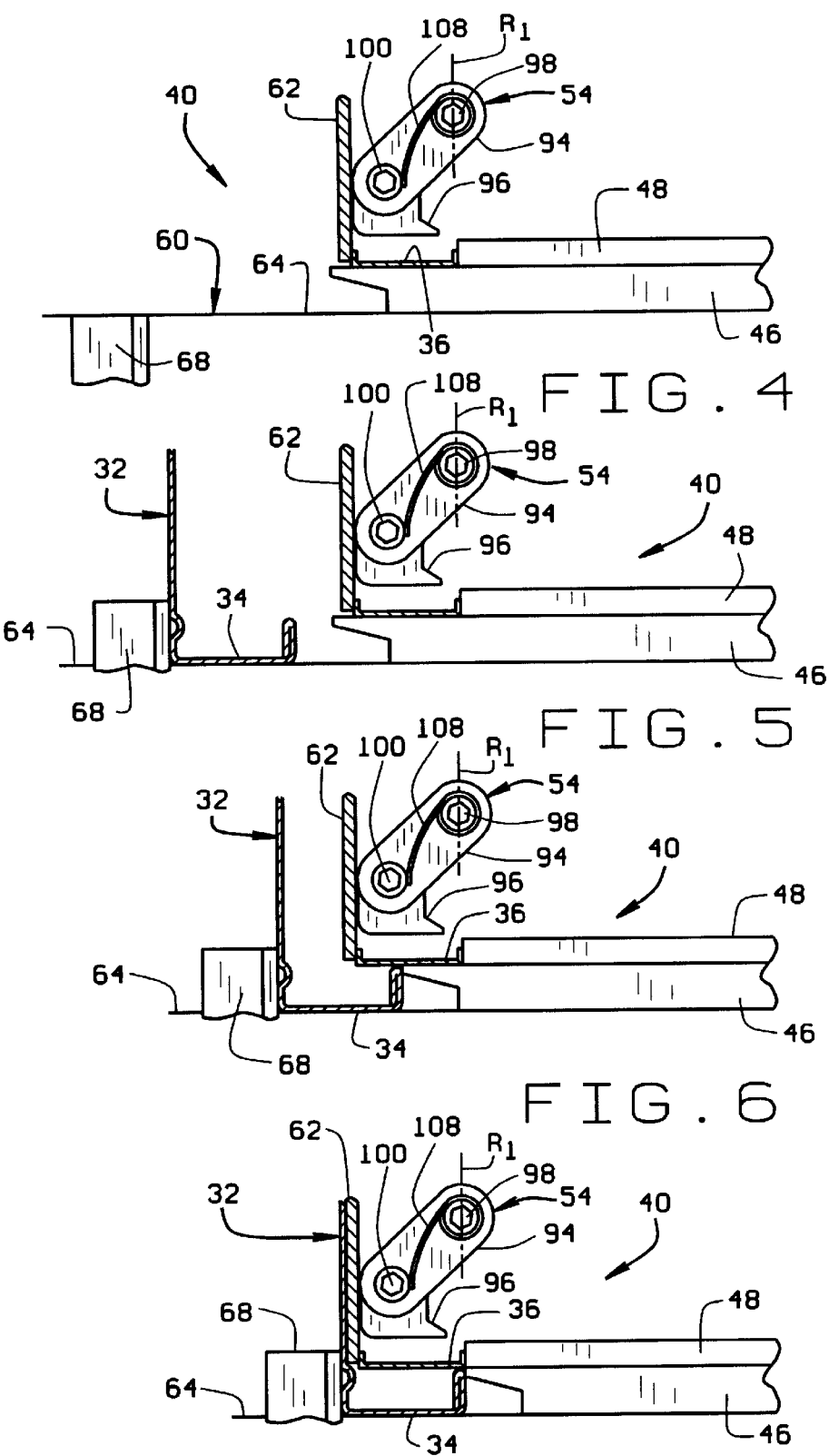

APPARATUS AND METHOD FOR INSERTING CORNER MEMBERS IN CHANNEL-SHAPED FLANGES OF A DUCT

This application is a divisional of application Ser. No. 09/139,613 filed on Aug. 25, 1998, now U.S. Pat. No. 6,081,985.

BACKGROUND OF THE INVENTION

This invention relates to apparatus and methods for inserting corner members in channel-shaped flanges of a duct.

A typical sheet metal duct section of the type used in heating, ventilating, and air-conditioning systems (HVAC systems) is usually square or rectangular in cross-sectional shape. Such a duct section usually has channel-shaped flanges extending outwardly from its end edges for end-to-end attachment to another duct section. Corner members (or angle plates) having first and second legs are inserted into adjacent flanges of the duct in a manner so that the first leg is in one flange and the second leg is in the other flange. The flanges are then crimped to secure the corner members in the flanges. Each corner member has at least one aperture therethrough. When duct sections are positioned end-to-end, then the corner member apertures of one duct section align with the corner member apertures of the other duct section. The aligned apertures are sized and configured for receiving threaded fasteners (e.g., bolts and nuts) to clamp the duct sections together.

Insertion of the corner members into the flanges is typically performed manually. A technician places a corner member on the flanges, forces the corner members into the channel-shaped flanges with a hammer or other suitable tool such as pliers, and then manually crimps the flanges. The primary problems associated with such manual insertion are that this operation is labor intensive and time consuming.

Machines have been used to automatically remove a corner member from a stack of corner members and insert it into duct flanges. With such machines, the duct is first clamped in a fixed position on the machine. A corner member is then removed from the stack, brought into engagement with the duct, and pressed into the duct flanges. After the corner member is pressed into the duct flanges, the machine crimps the flanges to retain the corner member in the flanges. A problem associated with such machines is that a user cannot determine whether a corner member is mis-fed from the stack (or not fed from the stack at all) until after the duct-crimping step is completed. This may result in damage to the duct and delays in the insertion process.

SUMMARY OF THE INVENTION

Among the several objects of the present invention may be noted the provision of improved apparatus and method for inserting corner members in channel-shaped flanges of a duct; the provision of such apparatus and method which enables a user to minimize the chances that the flanges of the duct will be crimped without first properly positioning the duct and corner members relative to one another, the provision of such apparatus and method which enables a user to visually verify that a corner member and duct have been properly positioned relative to one another before attempting to press the corner member into the duct flanges; and the provision of such apparatus which is of relatively simple construction.

Generally, apparatus of the present invention is configured for inserting a corner member into channel-shaped flanges of a duct. The corner member has first and second legs. The duct includes longitudinally extending duct panels. The channel-shaped flanges of the duct extend laterally from at least one end of the duct panels. The apparatus comprises a corner member support mechanism, a duct moving mechanism, and a pressing mechanism. The corner member support mechanism is adapted for supporting the corner member. The duct moving mechanism has a duct pusher moveable between a first position and a second position. The duct pusher is adapted to impart a moving force against the duct upon movement of the duct pusher from its first position to its second position. The duct moving mechanism is adapted to move the duct toward the corner member and to a position in which adjacent flanges of the duct are in registration with the legs of the corner member upon movement of the duct pusher from its first position to its second position when the corner member is being supported by the corner member support mechanism and when the duct pusher is imparting the moving force against the duct. The pressing mechanism has at least one pressing member moveable between a non-pressing position and a pressing position. The pressing mechanism is adapted to press the corner member into the duct flanges upon movement of the pressing member from its non-pressing position to its pressing position when the flanges of the duct are in registration with the legs of the corner member.

Another aspect of the present invention is a method of inserting a corner member into channel-shaped flanges of a duct. The corner member has first and second legs. The duct includes longitudinally extending duct panels, the channel-shaped flanges of the duct extending laterally from at least one end of the duct panels. The method comprises supporting the corner member, moving the duct toward the corner member and to a position in which adjacent flanges of the duct are in registration with the legs of the corner member, and pressing the corner member into the duct flanges.

Other objects and features will be in part apparent and in part pointed out hereinafter.

FIG. 4 is a fragmented side-elevational view of the lower corner inserting mechanism, in schematic form, the lower corner inserting mechanism including a crimper plate, a corner member pusher on the crimper plate, and a press mechanism, a corner member being shown adjacent a forward end of the corner pusher member, the corner member being positioned for receiving a duct flange;

FIG. 5 is a fragmented side-elevational view similar to FIG. 4 but showing a duct positioned forward of the crimper plate;

FIG. 6 is a fragmented side-elevational view similar to FIG. 5 but showing the duct moved rearward to a position in which part of the flanges of the duct are under the corner member and the crimper plate is pushed rearward by the duct;

FIG. 7 is a fragmented side-elevational view similar to FIG. 6 but showing the duct moved rearward to a position in which flanges of the duct are in registration with the corner member;

Corresponding reference characters indicate corresponding parts throughout the several views of the drawings.

DETAILED DESCRIPTION OF THE PREFERRED EMBODIMENT

Figure 1:
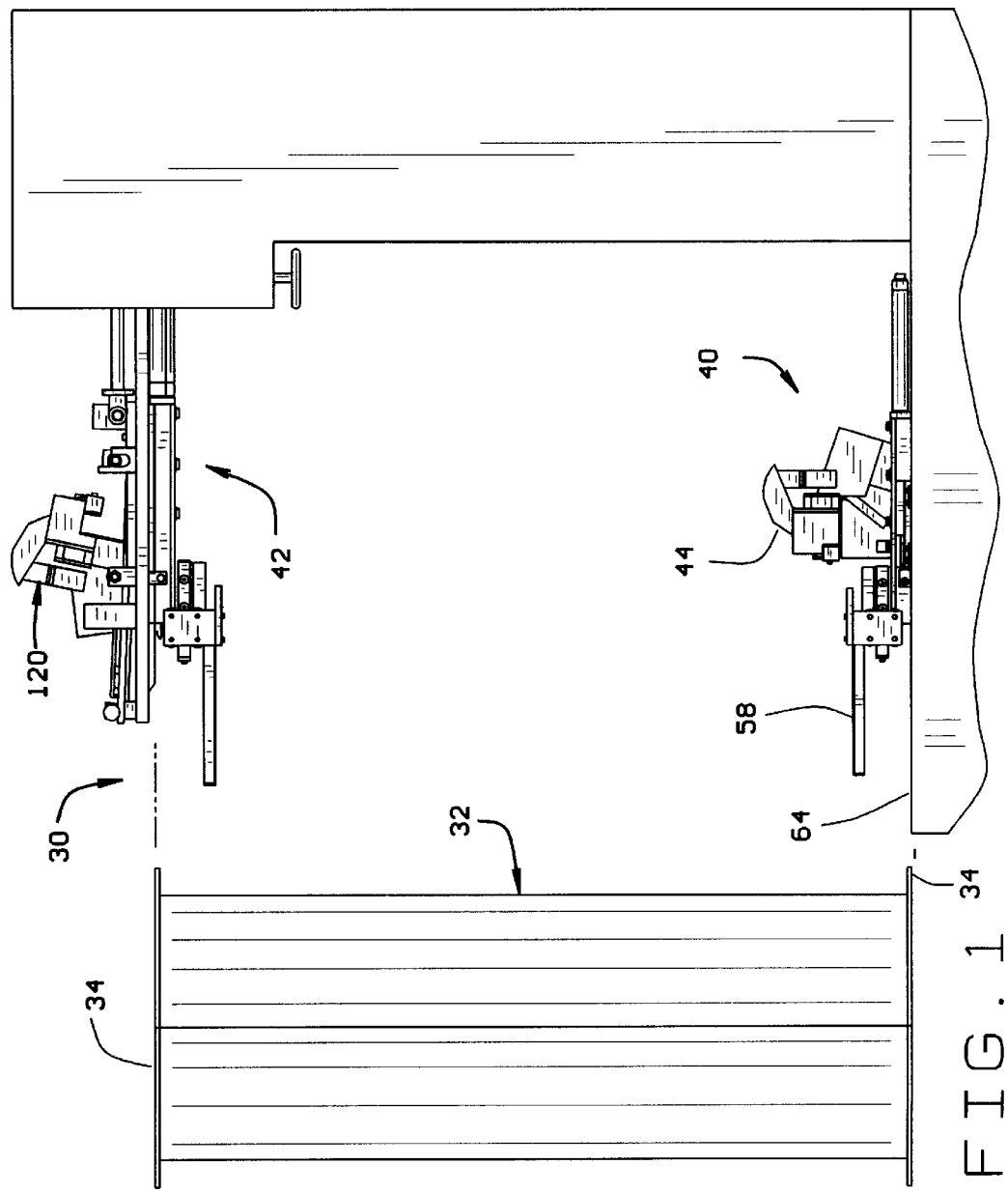
FIG. 1 is a fragmented side elevational view of a corner inserting apparatus of the present invention having a lower corner inserting mechanism and an upper corner inserting mechanism.
Figure 2:
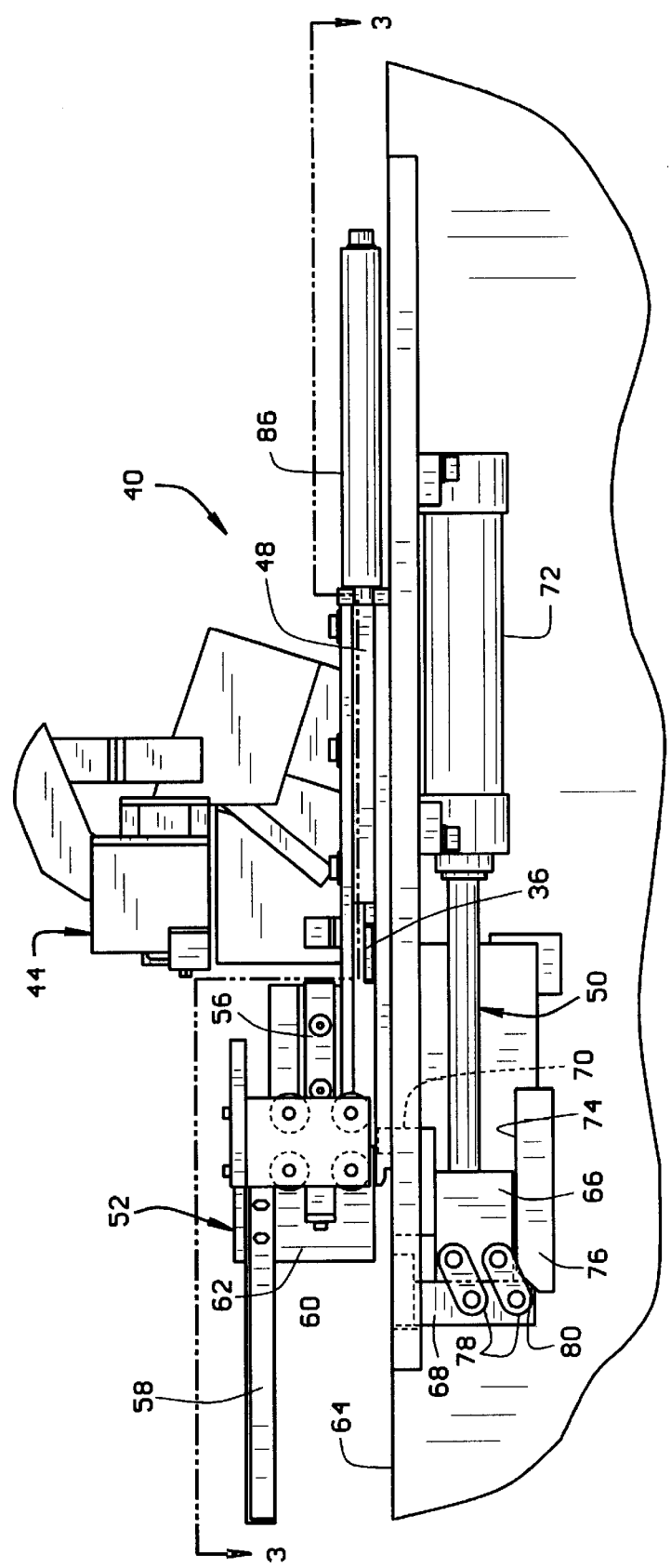
FIG. 2 is an enlarged, fragmented side elevational view of the lower corner inserting mechanism of FIG. 1 with portions broken away to show detail.
Figure 3:
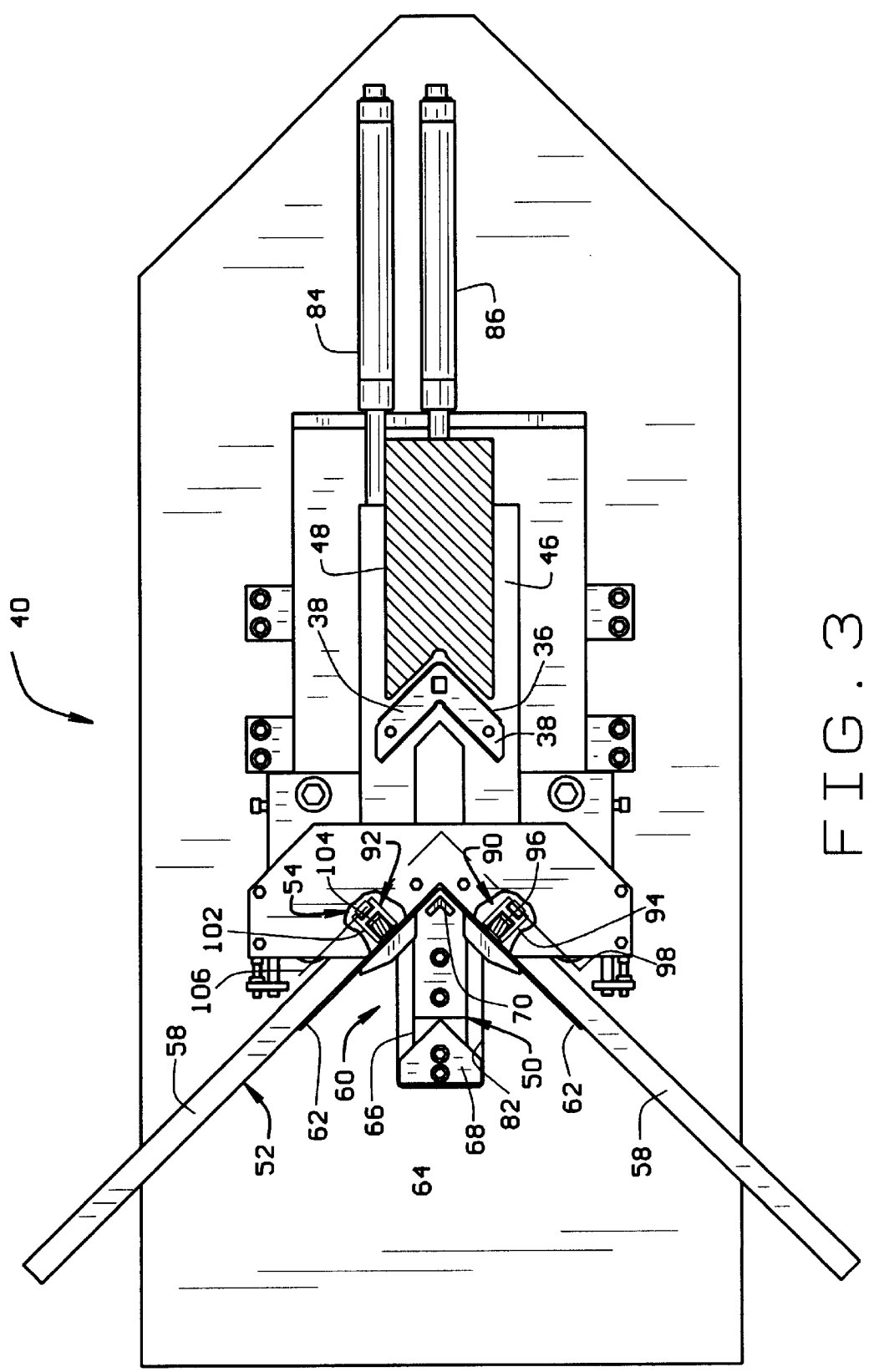
FIG. 3 is a sectional view taken along the plane of line 3—3 of FIG. 2, showing a fragmented top plan view of the lower corner inserting mechanism of FIG. 1 with portions broken away to show detail.

Referring now to the drawings, and first more particularly to FIGS. 1–3, a corner inserting apparatus of the present invention is indicated in its entirety by the reference numeral 30. The corner inserting apparatus is configured for removing a first corner member from a stack of corner members (sometimes referred to as angle plates), moving a duct so that flanges of the duct are in registration with the corner member, pressing the corner member into the duct flanges, and crimping the duct flanges to secure the corner member in the duct flanges. The duct, generally indicated at 32, includes channel-shaped flanges 34 extending outwardly from its upper and lower end edges for end-to-end attachment to another duct (not shown). As shown in FIG. 3, the corner member, generally indicated at 36, has a pair of angularly extending legs 38. Preferably, the legs 38 of the corner member 36 form a ninety-degree angle and are sized and configured for a snug fit in a pair of adjacent flanges 34 of the duct 32.

The corner inserting apparatus 30 includes a lower corner inserting mechanism, generally indicated at 40, and an upper corner inserting mechanism, generally indicated at 42. The lower corner inserting mechanism 40 is configured for inserting corner members 36 into the lower flanges of the duct 32. The upper corner inserting mechanism 42 is configured for inserting corner members into the upper flanges of the duct 32. The corner inserting apparatus 30 is configured so that the upper and lower corner inserting mechanisms operate at the same time to simultaneously insert corner members into the upper and lower duct flanges. Preferably, the height of the upper corner inserting mechanism 42 is adjustable relative to the lower corner inserting mechanism 40 so that the corner inserting apparatus can accommodate ducts of diverse lengths.

Referring to FIGS. 2 and 3, the lower corner inserting mechanism 40 includes a corner dispensing mechanism, generally indicated at 44, for dispensing a corner member 36 from a stack of corner members, a crimper plate 46, a corner member pusher 48, a duct moving mechanism 50, a duct squaring assembly 52, and a press mechanism 54. The corner dispensing mechanism 44 separates the bottom-most corner member from the other corner members of the stack and drops it onto the crimper plate 46. The corner dispensing mechanism 44 is described in detail in co-pending and commonly owned U.S. patent application Ser. No. 08/801,062, filed Feb. 17, 1997 and incorporated herein by reference.

The duct squaring assembly 52 is generally adjacent the forward end of the crimper plate 46 and rides on horizontal rails 56 between a forward position (or left most position as shown in FIGS. 2 and 3) and a rearward position. It includes two diagonally-extending horizontal bars 58 which extend outwardly from one another at a right angle (shown in FIG. 3) to form a duct receiving area, generally indicated at 60. A pair of small vertical plates 62 extend down from the diagonally extending bars 58. The vertical plates 62 are positioned to stop forward movement of the corner member 36 on the crimper plate 46. As discussed in greater detail below, the corner member pusher 48 slides the corner member 36 on the crimper plate 46 to a forward position in which the corner member is located on an end margin of the crimper plate. The crimper plate 46 is supported by and slides on a generally flat, horizontal platform 64.

The duct moving mechanism 50 includes a horizontally moveable block 66, an inner duct-engaging member 68, an outer duct-engaging member 70, and a horizontally disposed linear actuator, such as a hydraulic actuator 72 (FIG. 2). The horizontally moveable block 66 is shaped and sized to move forward and rearward (left and right as viewed in FIG. 2) on an upper horizontal surface 74 of a stationary support 76. The hydraulic actuator 72 is configured to move the horizontally moveable block 66 linearly between a forward position (shown in FIG. 2) and a rearward position (not shown). The inner duct-engaging member 68 is connected to the horizontally moveable block preferably by a parallelogram connection 78. The parallelogram connection 78 allows the inner duct-engaging member 68 to move up and down relative to the horizontally moveable block 66 without turning or tilting of the inner duct-engaging member relative to the moveable block. Preferably, the forward end of the stationary support 76 has a sloped surface 80 engageable with a lower portion of the inner duct-engaging member 68. The sloped surface 80 acts as a ramp to cam the inner duct-engaging member 68 upward as the hydraulic actuator 72 pulls the horizontally moveable block 66 rearwardly. Thus, the inner duct-engaging member 66 is moveable between a lowered position (shown in FIG. 2) and a raised position. When the inner duct-engaging member 66 is in its lowered position, its upper-most surface is flush with or spaced below the flat upper surface of the stationary platform 64. When the inner duct-engaging member 66 is in its raised position, its upper-most surface is spaced above the flat upper surface of the stationary platform. Preferably, the stationary platform 64 has a slot 82 (FIG. 3) therethrough for passage of the inner duct-engaging member 68 as the hydraulic actuator 72 moves the horizontally moveable block 66 between its forward and rearward positions. The outer duct-engaging member 70 extends upwardly through the slot 82 and is fixed to and moveable with the horizontally moveable block 66.

After the duct 32 (not shown in FIGS. 2 and 3) is placed on the stationary platform 64 in the duct receiving area 60 of the duct squaring assembly 52, the hydraulic actuator 72 is operated to pull the horizontally moveable block 66 rearward (i.e., to the right as viewed in FIGS. 2 and 3). As the block 66 moves rearward, the inner duct-engaging member 68 immediately moves to its raised position and engages an inside corner of the duct 32 and linearly pushes the duct rearwardly along the surface of the platform. As the duct moves rearwardly, it pushes against the duct squaring assembly 52. Thus, the duct squaring assembly 52 moves rearwardly with the duct. As will be discussed in greater detail below, the rearward movement of the duct causes the corner member 36 to be pressed into the duct flanges and then the duct flanges to be crimped. After the duct has been moved to its rearward most position, the hydraulic actuator 72 is operated to move the horizontally moveable block 66 from its rearward position to its forward position. As the block 66 moves forward, the outer duct-engaging member 70 engages the duct to push the duct to its forward-most position.

The crimper plate 46 is supported by and slides on the upper surface of the stationary platform 64. The crimper plate 46 is moveable between a forward position (shown in FIGS. 2 and 3) and a rearward position. The crimper plate 46 is preferably moveable from its rearward position to its forward position via a suitable linear actuator, such as a pneumatic actuator 84. Preferably, the pneumatic actuator 84 is not secured to the crimper plate 46. Thus, retraction of the actuator 84 does not result in rearward movement of the crimper plate. Rather, as will be discussed in greater detail below, the crimper plate 46 is moved from its forward position to its rearward position via movement of the duct from its forward position to its rearward position. The corner member pusher 48 is moveable between a rearward position (shown in FIGS. 2 and 3) and a forward position via a suitable linear actuator, such as a pneumatic actuator 86. As will be discussed in greater detail below, the corner pusher member 48 pushes a corner member to a forward position and holds the corner member in its forward position as the flange of the duct is brought into engagement with the corner member.

Referring now to FIGS. 3–11, the press mechanism 54 of the lower corner inserting mechanism 40 includes right and left pressers (see FIG. 3), generally indicated at 90, 92. The right presser 90 includes a hanger 94 and a shoe 96. The upper end of the hanger 94 is pivotally attached to a stationary member of the lower corner inserting mechanism 40 for pivotal movement of the hanger about a horizontal axis 98 (see FIG. 3). As shown in FIGS. 4–11, the horizontal axis 98 lies in a stationary vertical reference plane $R_1$. The shoe 96 is pivotally attached at 100 to the lower end of the hanger 94. The left presser 90 includes a hanger 102 and a shoe 104. The upper end of the hanger 102 of the left presser 92 is pivotally attached to a stationary member of the lower corner inserting mechanism 40 for pivotal movement of the hanger about a horizontal pivot axis 106 (see FIG. 3). The shoe 104 is pivotally attached to the lower end of the hanger 102. Each presser 90, 92 includes a spring 108 and is pivotally moveable about its pivot axis between a forward (up), non-pressing position (shown in FIGS. 4–7, 10 and 11) and a rearward (down), pressing position (shown in FIG. 9). The shoes 96, 104 are in their up positions when the hangers 94, 102 are in their forward positions and are in their down positions when the hangers are pivoted to their rearward positions. Thus, each shoe 96, 104 moves along an arcuate path as it moves between its up and down positions. The springs 108 are configured to bias the pressers 90, 92 in their forward (up), non-pressing positions. The bias of the springs 108 cause the shoes 96, 104 to press against the vertical plates 62 of the duct squaring assembly 52 to thereby urge the duct squaring assembly to its forward position.

In FIG. 4, the corner member 36 is held between a forward end of the corner member pusher 48 and the vertical plate 62 of the duct squaring assembly 52. In the lower corner inserting mechanism 40, the corner member pusher 48 and the upper surface of the crimper plate 46 constitute a corner member support mechanism for supporting the corner member. The inner duct-engaging member 68 of the duct moving mechanism 50 is positioned in its lowered, forward-most position with its upper surface being generally flush with the upper surface of the platform 64. With the corner member 36 so positioned, a duct 32 is placed on the stationary platform 64 as shown in FIG. 5 and in the duct receiving area of the duct squaring assembly. The duct moving mechanism 50 is then operated to move the inner duct-engaging member 68 to its raised position so that the duct-engaging member is in position to push the duct rearward. In FIG. 5, the inner duct-engaging member 68 (also referred to as a duct pusher) is in a first position (e.g., a forward, raised position). The duct moving mechanism 50 is then operated to push the duct 32 rearward.

Referring now to FIGS. 6 and 7, as the duct 32 is moved rearward, the duct flanges force the crimper plate 46 rearward and the duct flanges pass under the vertical plates 62 and under the corner member 36 until the flanges are in registration with the corner member and the body of the duct engages the vertical plates. In FIG. 7, the position of the inner duct-engaging member (duct pusher) 68 is a second position. Thus, the duct pusher 68 imparts a moving force against the duct 32 upon movement of the duct pusher from its first position (FIG. 5) to its second position (FIG. 7) to move the duct to a position in which adjacent flanges of the duct are in registration with the legs of the corner member 36.

Figure 8:
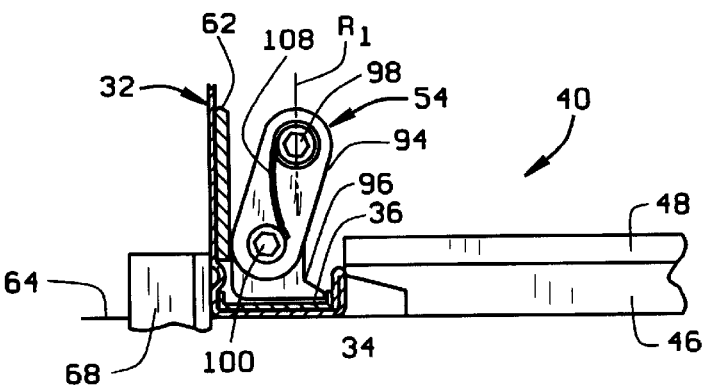
FIG. 8 is a fragmented side-elevational view similar to FIG. 7 but showing the duct moved rearward to effectuate pivoting movement of the press mechanism to thereby press the corner member into the duct flanges.
Figure 9:
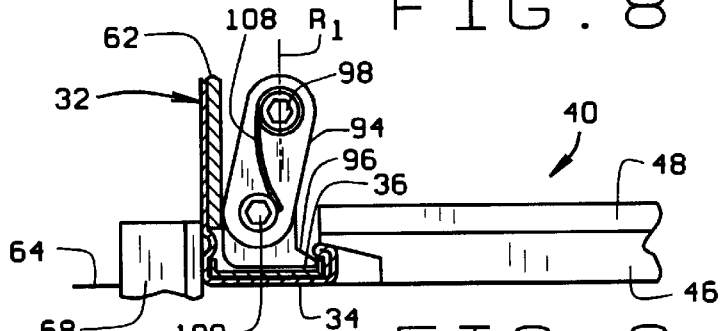
FIG. 9 is a fragmented side-elevational view similar to FIG. 8 but showing the duct moved rearward to a position to cause crimping of the duct flanges by the crimper member.

As shown in FIG. 8, further rearward movement of the duct 32 by the pusher member 68 moves the duct squaring assembly 52 rearward so that the vertical plate 62 pushes against the presser 90 to cause the presser to pivot about the pivot axis 98 toward its rearward pressing position. Movement of the presser 90 toward its pressing position forces the corner member 36 downward into the flanges of the duct 32. As the shoes 96, 104 simultaneously move from their up positions to their down positions, they press the corner member 36 into the channel-shaped duct flanges. The vertical plates 62 of the duct squaring assembly 52 engage forward edges of the shoes 96, 104 to maintain the undersides of the shoes in a horizontal orientation as the shoes are moved from their up positions to their down positions to thereby prevent tilting of the corner member 36 as it is pressed into the duct flanges. In FIG. 8, the position of the inner duct-engaging member (duct pusher) 68 is a third position. Thus, movement of the duct presser 68 from its second position to its third position causes movement of the shoes (i.e., pressing members) 96, 104 from their raised, non-pressing position to their lowered, pressing position. Preferably, a stop member (not shown) is provided for preventing rearward movement of the crimper plate 46 beyond the position shown in FIG. 8. The crimper plate 46 has a forward edge shaped to receive the flanges of the duct. Accordingly, further rearward movement of the duct 32 to its rearward-most position (shown in FIG. 9), forces the rearward edges of the duct flanges against the forward edge of the crimper plate 46 in a manner which crimps the flanges to secure the corner member 36 in the flanges. In FIG. 9, the position of the duct pusher 68 is a fourth position and the crimper plate 46 remains stationary as the duct pusher 68 is moved from its third position to its fourth position. Thus, movement of the duct pusher 68 from its third position to its fourth position causes the flanges of the duct to be crimped by the forward end of the crimper plate 46.

As described herein, it is to be understood that movement of the duct pusher 68 between any of its first, second, third, and fourth positions is along a straight line. It is also to be understood that in operation, the duct pusher 68 is moved from its first position (FIG. 5) to its fourth position (FIG. 9) in a continuous manner, i.e., without stopping.

Figure 10:
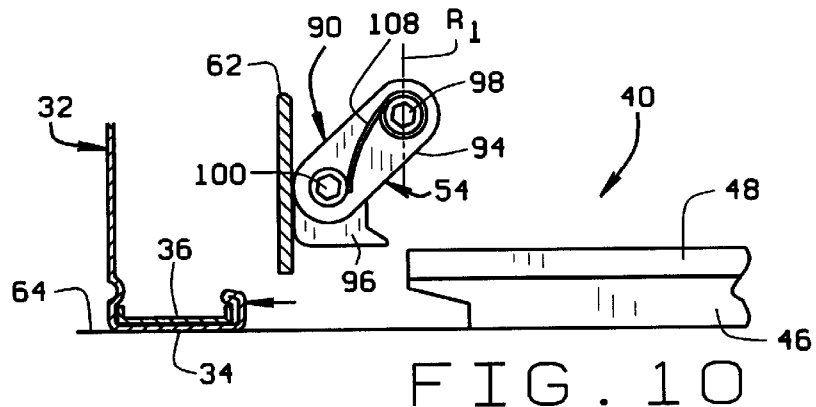
FIG. 10 is a fragmented side-elevational view similar to FIG. 9 but showing the duct moved forward after insertion of the corner member in the duct flanges, and the press mechanism pivoted to a non-pressing position.
Figure 11:
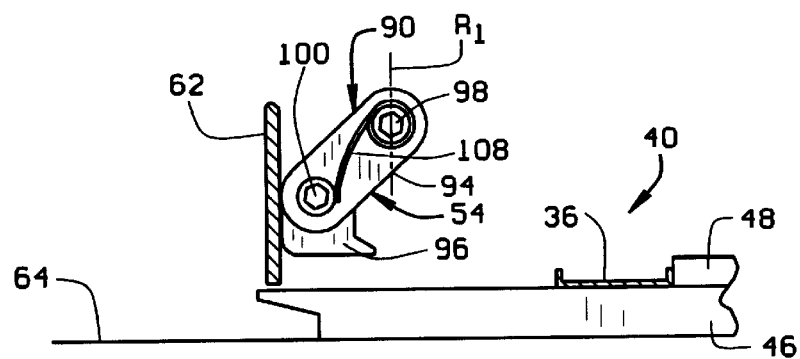
FIG. 11 is a fragmented side elevational view similar to FIG. 10 but showing the duct removed from the lower corner inserting mechanism, the crimper plate moved to a forward position, the corner member pusher moved to a rearward position, and a corner member placed onto the crimper plate.

After the flanges are crimped, the hydraulic actuator 72 of the duct moving mechanism 50 is operated to push the block 66 (FIG. 2) forward so that the outer duct-engaging member 70 pushes the duct 32 forward as shown in FIG. 10. As shown in FIG. 11, the duct 32 is then removed from the stationary platform 64, the crimper plate 46 is moved to its forward position, the corner member pusher 48 is moved to its rearward position, and the corner dispensing mechanism 44 (FIG. 2) dispenses another corner member 36 onto the crimper plate and forward of the corner member pusher. The corner member 36 is then pushed to its forward position shown in FIG. 4 and waits for another duct to be placed on the stationary platform 64 and moved into engagement with the corner member. Thus, the corner inserting procedure is repeated for each pair of adjacent flanges of the duct.

Figure 12:
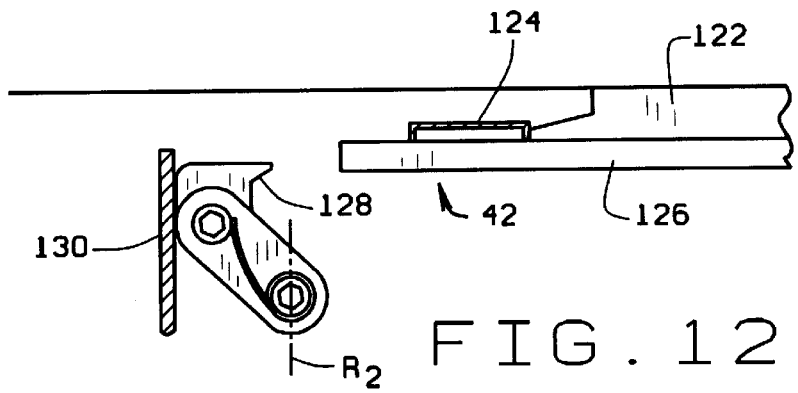
FIG. 12 is a fragmented side-elevational view of the upper corner inserting mechanism, in schematic form, the upper corner inserting mechanism including a stationary plate, a crimper plate slidable on the stationary plate, and a press mechanism, a corner member being shown on the stationary plate and adjacent a forward end of the crimper member.

The upper corner inserting mechanism 42 is not shown in detail. However, it is to be understood that the upper corner inserting mechanism 42 operates in a manner similar to the lower corner inserting mechanism 40. These mechanisms are different because the upper mechanism 42 must press a corner member upward into upper duct flanges while the lower mechanism must press a corner member downward into lower duct flanges. Similar to the lower mechanism 40, the upper mechanism 42 includes a corner dispensing mechanism 120 (FIG. 1), a crimper plate 122 (FIGS. 12–18), a duct moving mechanism, a duct squaring assembly and a press mechanism. The corner dispensing mechanism 120 separates the bottom-most corner member 124 from the other corner members of the stack and drops it onto a stationary plate 126 which supports the crimper plate 122. FIG. 12 shows the corner member 124 positioned on the stationary plate 126. To assist in the understanding of the relative motions of the various parts, a stationary, vertical reference plane $R_2$ is included in FIGS. 12–18. The reference plane $R_2$ passes through the pivot axis of the right presser.

Figure 13:
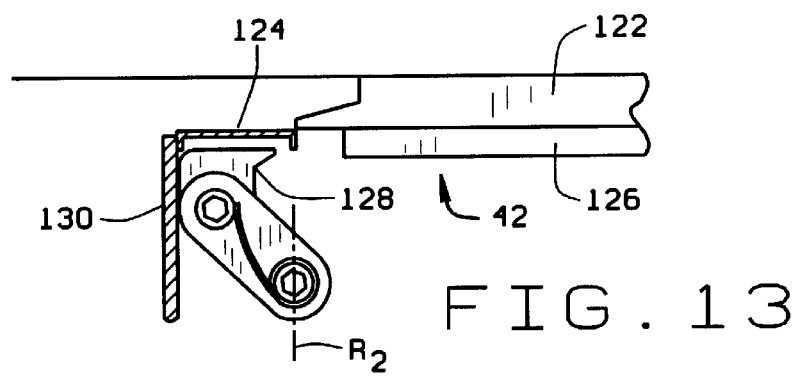
FIG. 13 is a fragmented side-elevational view similar to FIG. 12 but showing the crimper plate moved forward to position the corner member on the press mechanism.
Figure 14:
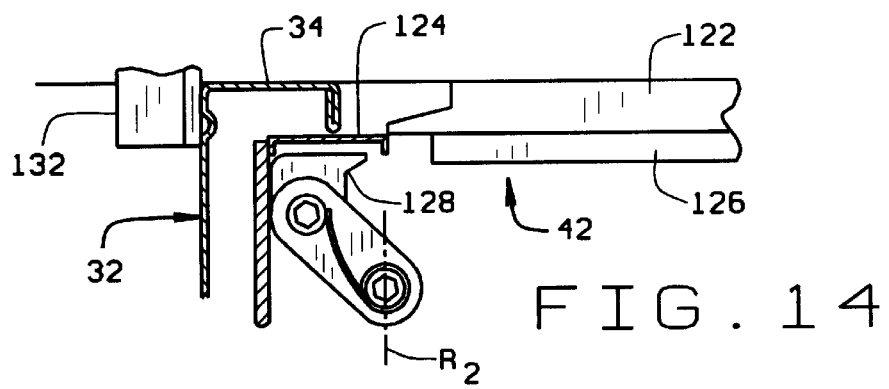
FIG. 14 is a fragmented side-elevational view similar to FIG. 13 but showing a duct positioned so that part of its flanges are over the crimper member.

Referring now to FIG. 13, the crimper plate 122 is then moved forward via a suitable linear actuator (not shown) to slide the corner member 124 to a forward position in which the corner member is located on shoes 128 of the upper mechanism's press mechanism. Vertical plates 130 of the duct squaring assembly prevent the corner member 124 from overshooting the shoes 128 as the corner member is moved to its forward position (i.e., the position shown in FIG. 13). A duct pusher 132 of the upper mechanism's duct moving mechanism is moveable via a suitable linear actuator (preferably a hydraulic actuator, not shown) between forward and rearward positions.

Figure 15:
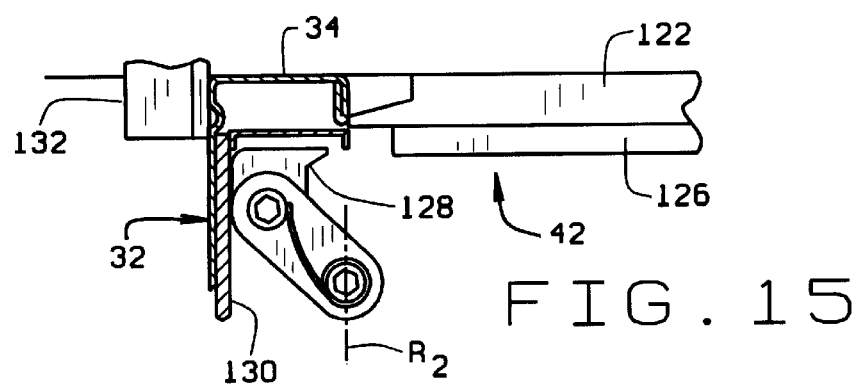
FIG. 15 is a fragmented side-elevational view similar to FIG. 14 but showing the duct moved rearward to a position in which the flanges of the duct are in registration with the corner member.
Figure 16:
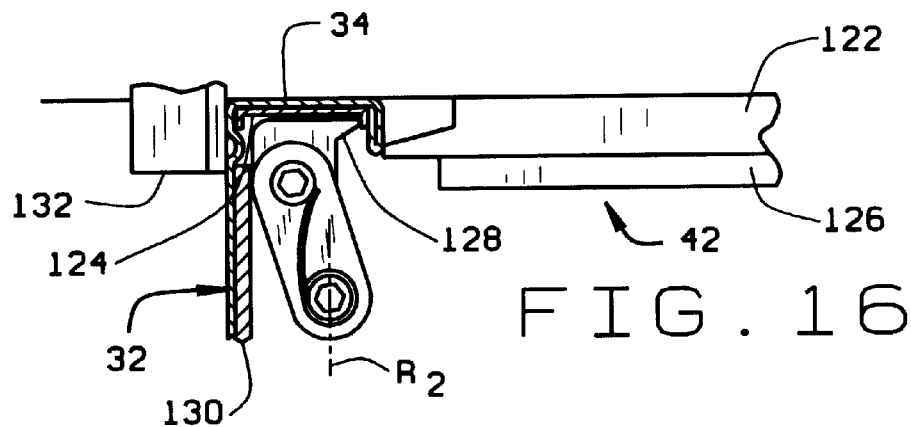
FIG. 16 is a fragmented side-elevational view similar to FIG. 15 but showing the duct moved rearward to effectuate pivoting movement of the press mechanism to thereby press the corner member into the duct flanges.
Figure 17:
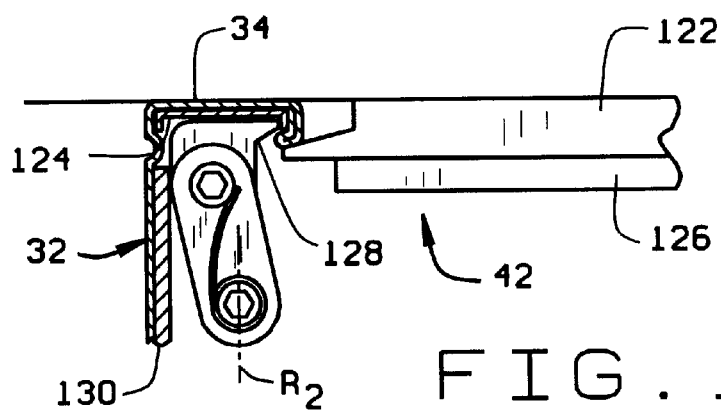
FIG. 17 is a fragmented side-elevational view similar to FIG. 16 but showing the duct moved rearward to a position to cause crimping of the duct flanges by the crimper member.
Figure 18:
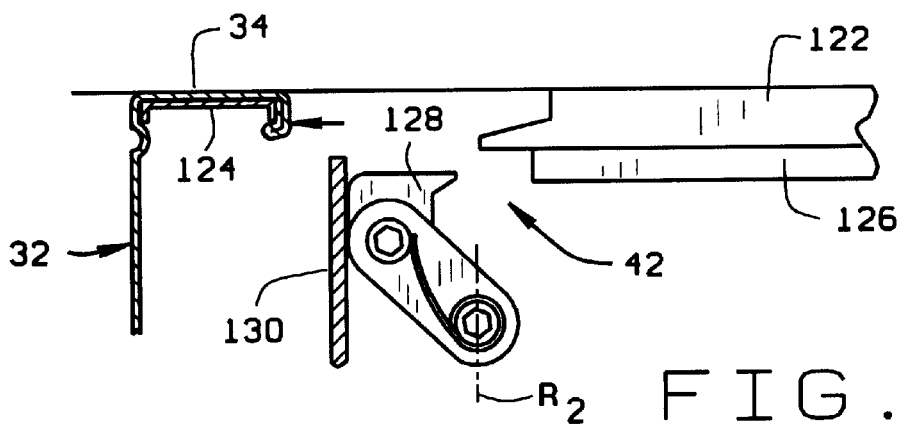
FIG. 18 is a fragmented side-elevational view similar to FIG. 17 but showing the duct moved forward after insertion of the corner member in the duct flanges, and the press mechanism pivoted to a non-pressing position.

The press mechanism of the upper mechanism 42 operates in the same manner as the press mechanism 54 of the lower mechanism 40. As a duct 32 is placed on the corner inserting apparatus 30 and moved rearwardly by the lower and upper duct pushers 68, 132, the upper flanges of the duct are moved into registration with the legs of the corner member 124 as shown in FIG. 15. Further rearward movement of the duct 32 by the duct pushers 68, 132 from the position shown in FIG. 15 to the position shown in FIG. 16 causes the shoes 128 to move along an arcuate path to press the corner member 124 into the upper flanges. Rearward movement of the duct 32 by the duct pushers 68, 132 from the position shown in FIG. 16 to the position shown in FIG. 17 causes the upper flanges to be crimped by the forward edge of the crimper plate 122. After crimping is completed, the duct moving mechanisms are operated push the duct 32 forward as shown in FIG. 18. Thus, the upper mechanism 42 inserts corner members into the upper flanges at the same time the lower mechanism 40 inserts corner members into the lower flanges.

In operation, corner members 36, 124 dispensed from the corner dispensing mechanisms of the lower and upper inserting mechanisms 40, 42 are moved to forward positions before a duct is positioned on the corner inserting apparatus 30. Because the corner members 36, 124 are moved to forward positions before a duct is placed on the apparatus 30, the operator can visually verify that the corner members are properly positioned. If the corner members are not properly moved to their forward positions, the operator can fix or reload the apparatus 30 before placing the duct 32 on the apparatus. After the operator visually verifies that the corner members are properly positioned, he/she then picks up the duct 32 and places it on the platform 64. Next, the operator operates the duct moving mechanisms via a suitable controller (not shown) to move the duct pushers 68, 132 rearward so that the duct pushers push the duct 32 rearwardly. After the duct 32 is moved to a position in which the flanges are in registration with the corner members 36, 124, further rearward movement of the duct causes the shoes of the press mechanisms to pivot rearwardly and thereby press the corner members into the duct flanges. Further rearward movement of the duct causes the duct flanges to push against the now stationary crimper plates 46, 122 and thereby be crimped by the crimper plates. The aligning, pressing and crimping steps are performed as the duct pushers 68, 132 move in a continuous manner from their forward positions (FIGS. 5 and 13) to their rearward positions (FIGS. 9 and 17). Interestingly, because the duct squaring mechanisms, pressing mechanisms and crimper plates do not rely on separate actuators to enable them to perform their intended functions, they do not move from their forward-most positions upon rearward movement of the duct pushers unless a duct is first properly positioned on the apparatus 30. When the duct pushers 68, 132 reach their rearward positions, the hydraulic actuators are operated by the controller to return the duct pushers to their forward positions. As the duct pushers are moved to their forward positions, the outer duct-engaging members of the duct moving mechanisms move the duct 32 to a forward position. The duct 32 is then removed from the corner inserting apparatus with corner members secured in the lower and upper duct flanges. The controller then operates the corner dispensing mechanism and the linear actuators corresponding to both the crimper plates and the corner member pushers to move new corner members to forward positions to receive new duct flanges In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. An apparatus for inserting a corner member into channel-shaped flanges of a duct, the corner member having first and second legs, the duct including longitudinally extending duct panels, the channel-shaped flanges of the duct extending laterally from at least one end of the duct panels, each channel-shaped flange defining a corner member receiving region sized for receiving one of the legs of the corner member, the apparatus comprising:

a corner member support mechanism adapted for supporting the corner member;

a duct moving mechanism having a duct pusher moveable between a first position and a second position, the duct pusher being adapted to impart a moving force against the duct upon movement of the duct pusher from its first position to its second position, the duct moving mechanism being adapted to move the duct toward the corner member and to a position in which adjacent flanges of the duct are in registration with the legs of the corner member such that the legs of the corner member are superposed with the corner member receiving regions of the adjacent flanges upon movement of the duct pusher from its first position to its second position when the corner member is being supported by the corner member support mechanism and when the duct pusher is imparting the moving force against the duct; and a pressing mechanism having at least one pressing member moveable between a non-pressing position and a pressing position, the pressing mechanism being adapted to press the corner member into the duct flanges upon movement of the pressing member from its non-pressing position to its pressing position when the flanges of the duct are in registration with the legs of the corner member.

2. The apparatus of claim 1 wherein the duct pusher of the duct moving mechanism is further moveable between the second position and a third position, the duct moving mechanism and the pressing mechanism being adapted so that movement of the duct pusher from the second position to the third position causes movement of the pressing member from its non-pressing position to its pressing position.

3. The apparatus of claim 2 wherein the duct moving mechanism and the pressing mechanism are adapted so that movement of the duct pusher from its second position to its third position drives the pressing member from its non-pressing position to its pressing position.

4. The apparatus of claim 2 wherein the duct moving mechanism and the pressing mechanism are adapted so that movement of the duct pusher from its second position to its third position imparts a motive force to the pressing mechanism via the duct to move the pressing member from its non-pressing position to its pressing position.

5. The apparatus of claim 4 wherein the duct pusher of the duct moving mechanism is further moveable between the third position and a fourth position to further move the duct, the apparatus further comprising a crimping member, the duct moving mechanism and the crimping member being adapted so that movement of the duct by way of movement of the duct pusher from the third position to the fourth position causes the flanges of the duct to be crimped by the crimping member.

6. The apparatus of claim 5 wherein the duct moving mechanism is configured and adapted to push the duct toward the crimping member after the pressing mechanism presses the corner member into the duct flanges.

7. The apparatus of claim 6 wherein the apparatus is configured and adapted to maintain the crimping member in a fixed position while the duct moving mechanism moves the duct pusher from its third position to its fourth position.

8. The apparatus of claim 5 wherein the duct moving mechanism is configured so that movement of the duct pusher between any of its first, second, third, and fourth positions is along a straight line.

9. The apparatus of claim 2 wherein the second position of the duct pusher is between the first and third positions, and wherein the moving mechanism is adapted for moving the duct pusher from its first position to its third position in a continuous manner.

10. The apparatus of claim 2 wherein the duct moving mechanism is configured so that movement of the duct pusher between any of its first, second and third positions is along a straight line.

11. The apparatus of claim 1 wherein the pressing mechanism is adapted so that the pressing member traverses an arcuate path as the pressing member is moved between its non-pressing and pressing positions.

12. An apparatus for inserting a corner member into channel-shaped flanges of a duct, the corner member having first and second legs, the duct including longitudinally extending duct panels, the channel-shaped flanges of the duct extending laterally from at least one end of the duct panels, each channel-shaped flange defining a corner member receiving region sized for receiving one of the legs of the corner member, the apparatus comprising:

a corner member support mechanism adapted for supporting the corner member;

a duct moving mechanism having a duct pusher moveable between a first position and a second position, the duct pusher being adapted to impart a moving force against the duct upon movement of the duct pusher from its first position to its second position, the duct moving mechanism being adapted to move the duct toward the corner member and to a position in which adjacent flanges of the duct are in registration with the legs of the corner member such that the legs of the corner member are superposed with the corner member receiving regions of the adjacent flanges upon movement of the duct pusher from its first position to its second position when the corner member is being supported by the corner member support mechanism and when the duct pusher is imparting the moving force against the duct; and a pressing mechanism having at least one pressing member moveable between a non-pressing position and a pressing position, the pressing mechanism being adapted to simultaneously press the corner member into the adjacent duct flanges upon movement of the pressing member from its non-pressing position to its pressing position when the flanges of the duct are in registration with the legs of the corner member.

* * * * *